United States Patent
Miyashita

(10) Patent No.: US 9,969,294 B2
(45) Date of Patent: May 15, 2018

(54) POWER SUPPLY CONTROL SYSTEM

(71) Applicant: TOYOTA JIDOSHA KABUSHIKI KAISHA, Toyota-shi, Aichi-ken (JP)

(72) Inventor: Michihiro Miyashita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days. days.

(21) Appl. No.: 15/216,200

(22) Filed: Jul. 21, 2016

(65) Prior Publication Data

US 2017/0028979 A1 Feb. 2, 2017

(30) Foreign Application Priority Data

Jul. 31, 2015 (JP) ................................. 2015-151860

(51) Int. Cl.
*B60L 11/18* (2006.01)
*B60R 16/03* (2006.01)
(Continued)

(52) U.S. Cl.
CPC .......... *B60L 11/1872* (2013.01); *B60R 16/03* (2013.01); *H01M 10/44* (2013.01);
(Continued)

(58) Field of Classification Search
CPC ................ B60W 20/13; B60L 11/1872; G05B 2219/2637
(Continued)

(56) References Cited

U.S. PATENT DOCUMENTS 8,912,687 B2 * 12/2014 Kesler .................. B60L 11/182
307/104
8,922,066 B2 * 12/2014 Kesler ................. B60L 11/1812
307/104

(Continued)

FOREIGN PATENT DOCUMENTS

| JP | 2004-320877 A | 11/2004 |
|----|---------------|---------|
| JP | 2007-318913 A | 12/2007 |
| WO | 2013/105126 A1 | 7/2013 |

OTHER PUBLICATIONS

English Partial Translation of Notification of Reason(s) for Refusal dated Aug. 29, 2017 from the Japanese Patent Office in counterpart Japanese Application No. 2015-151860.

*Primary Examiner* — Atul Trivedi
(74) *Attorney, Agent, or Firm* — Sughrue Mion, PLLC

(57) ABSTRACT

A power supply control system includes a first controller that performs auxiliary-machine power reduction control for reducing electric power consumed by auxiliary machines, a second controller that performs high-voltage power generation control for making the generated voltage of the generator higher than the voltage set during the auxiliary-machine power reduction control, a frequency determining unit that determines whether the frequency of switching between the auxiliary-machine power reduction control and the high-voltage power generation control becomes equal to or higher than a predetermined frequency, and a lower-limit voltage setting unit that sets a lower-limit voltage of the generator under the auxiliary-machine power reduction control to a higher value when the frequency of switching is equal to or higher than the predetermined frequency, than when the frequency of switching is lower than the predetermined frequency.

4 Claims, 9 Drawing Sheets

(51) Int. Cl.
*H01M 10/44* (2006.01)
*H02J 7/16* (2006.01)
*B60K 6/48* (2007.10)

(52) U.S. Cl.
CPC .................. *H02J 7/16* (2013.01);
*B60K 6/48* (2013.01); *G05B 2219/2637*
(2013.01); *Y02T 10/6221* (2013.01); *Y02T*
*10/7005* (2013.01); *Y02T 10/92* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 8,932,179 B2* | 1/2015 | Banker | ............... | B60W 10/184 477/185 |
| 8,933,594 B2* | 1/2015 | Kurs | ................ | B60L 3/003 307/326 |
| 8,983,697 B2* | 3/2015 | Toki | ................ | B60K 6/48 701/22 |
| 8,993,184 B2* | 3/2015 | Kazuno | ............. | H01M 8/04873 429/428 |
| 9,035,499 B2* | 5/2015 | Kesler | ................ | B60L 3/0069 307/104 |
| 9,065,304 B2* | 6/2015 | Boughtwood | .......... | B60L 7/006 |
| 9,246,336 B2* | 1/2016 | Kurs | ................ | B60L 11/007 |
| 9,444,520 B2* | 9/2016 | Hall | ................ | B60L 11/182 |
| 9,450,220 B2* | 9/2016 | Holtappels | ............ | B60L 3/0046 |
| 2004/0159480 A1* | 8/2004 | Ishikawa | .................. | B60L 7/26 429/430 |
| 2006/0048734 A1* | 3/2006 | Kataoka | ................. | B60K 6/485 123/179.4 |
| 2008/0277176 A1* | 11/2008 | Akimoto | ................ | B60K 6/445 180/65.28 |
| 2009/0008165 A1* | 1/2009 | Muta | ...................... | B60K 6/365 180/65.25 |
| 2009/0105924 A1* | 4/2009 | Kamichi | ................ | B60K 6/365 701/99 |
| 2009/0115351 A1* | 5/2009 | Heap | ...................... | B60K 6/445 307/10.1 |
| 2009/0118079 A1* | 5/2009 | Heap | ........................ | B60K 6/26 477/3 |
| 2009/0118080 A1* | 5/2009 | Heap | ........................ | B60K 6/26 477/3 |
| 2009/0118081 A1* | 5/2009 | Heap | ........................ | B60K 6/26 477/3 |
| 2009/0118916 A1* | 5/2009 | Kothari | .................. | B60K 6/365 701/53 |
| 2009/0118962 A1* | 5/2009 | Heap | ........................ | B60K 6/26 701/99 |
| 2010/0026222 A1* | 2/2010 | Yoshida | ................. | B60K 6/445 318/400.22 |
| 2010/0033132 A1* | 2/2010 | Nishi | ..................... | B60K 6/365 320/136 |
| 2010/0204861 A1* | 8/2010 | Kaita | .................. | B60L 11/1851 701/22 |
| 2010/0280698 A1* | 11/2010 | Ichikawa | ............... | B60K 6/365 701/22 |
| 2010/0292880 A1* | 11/2010 | McGrogan | ............... | B60K 6/48 701/22 |
| 2011/0082621 A1* | 4/2011 | Berkobin | ............ | B60L 11/1824 701/31.4 |
| 2012/0112536 A1* | 5/2012 | Karalis | ................. | B60L 11/182 307/10.1 |
| 2012/0119575 A1* | 5/2012 | Kurs | ........................ | B60L 3/003 307/10.1 |
| 2012/0119698 A1* | 5/2012 | Karalis | ................. | B60L 11/182 320/108 |
| 2013/0073136 A1* | 3/2013 | Yamamoto | ............. | B60K 6/445 701/22 |
| 2013/0261865 A1* | 10/2013 | Toki | ........................ | B60K 6/48 701/22 |
| 2013/0293163 A1* | 11/2013 | Flett | ........................ | H02P 27/08 318/139 |
| 2013/0338862 A1* | 12/2013 | Guerin | ................ | B60L 11/1814 701/22 |
| 2014/0299089 A1* | 10/2014 | Koenen | .................... | F04B 17/05 123/179.28 |
| 2015/0151759 A1* | 6/2015 | Oyama | .................. | B60K 6/445 701/22 |
| 2015/0303434 A1* | 10/2015 | Holtappels | .......... | H01M 2/1072 320/136 |
| 2016/0276935 A1* | 9/2016 | Arai | .................... | B60L 11/1803 |

* cited by examiner

POWER SUPPLY CONTROL SYSTEM

INCORPORATION BY REFERENCE

The disclosure of Japanese Patent Application No. 2015-151860 filed on Jul. 31, 2015 including the specification, drawings and abstract is incorporated herein by reference in its entirety.

BACKGROUND

1. Technical Field

The disclosure relates to a technical field of a power supply control system installed on a vehicle, such as a hybrid vehicle.

2. Description of Related Art

As one example of this type of system, a system that controls charge/discharge of a battery installed on a vehicle is known. According to a technology proposed in Japanese Patent Application Publication No. 2007-318913 (JP 2007-318913 A), for example, when a battery voltage detected when discharge is started after regenerative power generation is higher than a predetermined value, it is determined that the amount of charge of the battery is larger than a target value, and the amount of discharge is controlled to be larger than an integrated value of current obtained through the regenerative power generation. When the battery voltage is lower than the predetermined value, it is determined that the charge amount of the battery is smaller than the target value, and the discharge amount is controlled to be smaller than the integrated value of current obtained through the regenerative power generation.

According to the technology described in JP 2007-318913 A as described above, when the battery is discharged, generated voltage of an alternator serving as a generator is controlled to be reduced. However, if the generated voltage is reduced excessively relative to the OCV (Open Circuit Voltage) of the battery, for example, the absolute value of current delivered from the battery is increased, which may result in reduction of the lifetime of the battery. Thus, when the generated voltage of the generator is controlled, it may be considered, as a technical problem, that the lifetime of the battery is reduced due to unintended increase of charge/discharge current.

SUMMARY

This embodiments provides a power supply control system capable of favorably curbing reduction of the lifetime of a power storage unit installed on a vehicle.

A first aspect is concerned with a power supply control system of a vehicle including a generator, a power storage unit capable of storing electric power generated by the generator, and one or more auxiliary machines that can be driven with electric power from the power storage unit. The power supply control system includes a first controller configured to perform auxiliary-machine power reduction control for reducing electric power consumed by the auxiliary machines, by setting a generated voltage of the generator so as to reduce an average value of voltage applied to the auxiliary machines, a second controller configured to perform high-voltage power generation control for making the generated voltage of the generator higher than the voltage set during the auxiliary-machine power reduction control, by inhibiting the auxiliary-machine power reduction control when the auxiliary machines perform high-load operation, a frequency determining unit configured to determine whether a frequency of switching between the auxiliary-machine power reduction control and the high-voltage power generation control becomes equal to or higher than a predetermined frequency, and a lower-limit voltage setting unit configured to set a lower-limit voltage of the generator under the auxiliary-machine power reduction control to a higher value when the frequency of switching is equal to or higher than the predetermined frequency, than when the frequency of switching is lower than the predetermined frequency.

With the power supply control system according to the above aspect, reduction of the lifetime of the power storage unit can be favorably curbed even when the frequency of switching between the auxiliary-machine power reduction control and the high-voltage power generation control is equal to or higher than the predetermined frequency.

In the above aspect, the vehicle may include an internal combustion engine as a power source, and the frequency determining unit may be configured to determine that the frequency of switching becomes equal to or higher than the predetermined frequency when a water temperature of a coolant of the internal combustion engine is equal to or higher than a predetermined first temperature.

If the temperature of the coolant of the internal combustion engine is used, it can be determined not only whether the current switching frequency is equal to or higher than the predetermined frequency, but also whether the switching frequency will be equal to or higher than the predetermined frequency in the future.

In the above aspect, the vehicle may include an electric motor as a power source, and a battery as an electric power supply source of the electric motor. The frequency determining unit may be configured to determine that the frequency of switching becomes equal to or higher than the predetermined frequency when a temperature of the battery is equal to or higher than a predetermined second temperature.

There arises a time lag between the time when the temperature of the battery becomes high, and the time when the frequency of switching between the auxiliary-machine power reduction control and the high-voltage power generation control becomes equal to the predetermined frequency. Therefore, if the temperature of the battery is used, it can be determined not only whether the current switching frequency is equal to or higher than the predetermined frequency, but also whether the switching frequency will be equal to or higher than the predetermined frequency in the future.

In the above aspect, the power supply control system may further include a setting unit configured to set a target charge amount as a target value of a charge amount of the power storage unit, and a detecting unit configured to detect a current charge amount of the power storage unit. The lower-limit voltage setting unit may be configured to (i) set the lower-limit voltage to a lower value than an open voltage of the power storage unit when the current charge amount is larger than the target charge amount, (ii) set the lower-limit voltage to the same value as the open voltage of the power storage unit when the current charge amount is equal to the target charge amount, and (iii) set the lower-limit voltage to a higher value than the open voltage of the power storage unit when the current charge amount is smaller than the target charge amount.

If the lower-limit voltage is set in the above manner based on the relationship between the current charge amount of the power storage unit and the target charge amount, it is possible to make the charge amount close to the target charge amount, while curbing reduction of the lifetime of the power storage unit by controlling charge/discharge of the power storage unit.

The operation and other advantages will be apparent from embodiments which will be described below.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
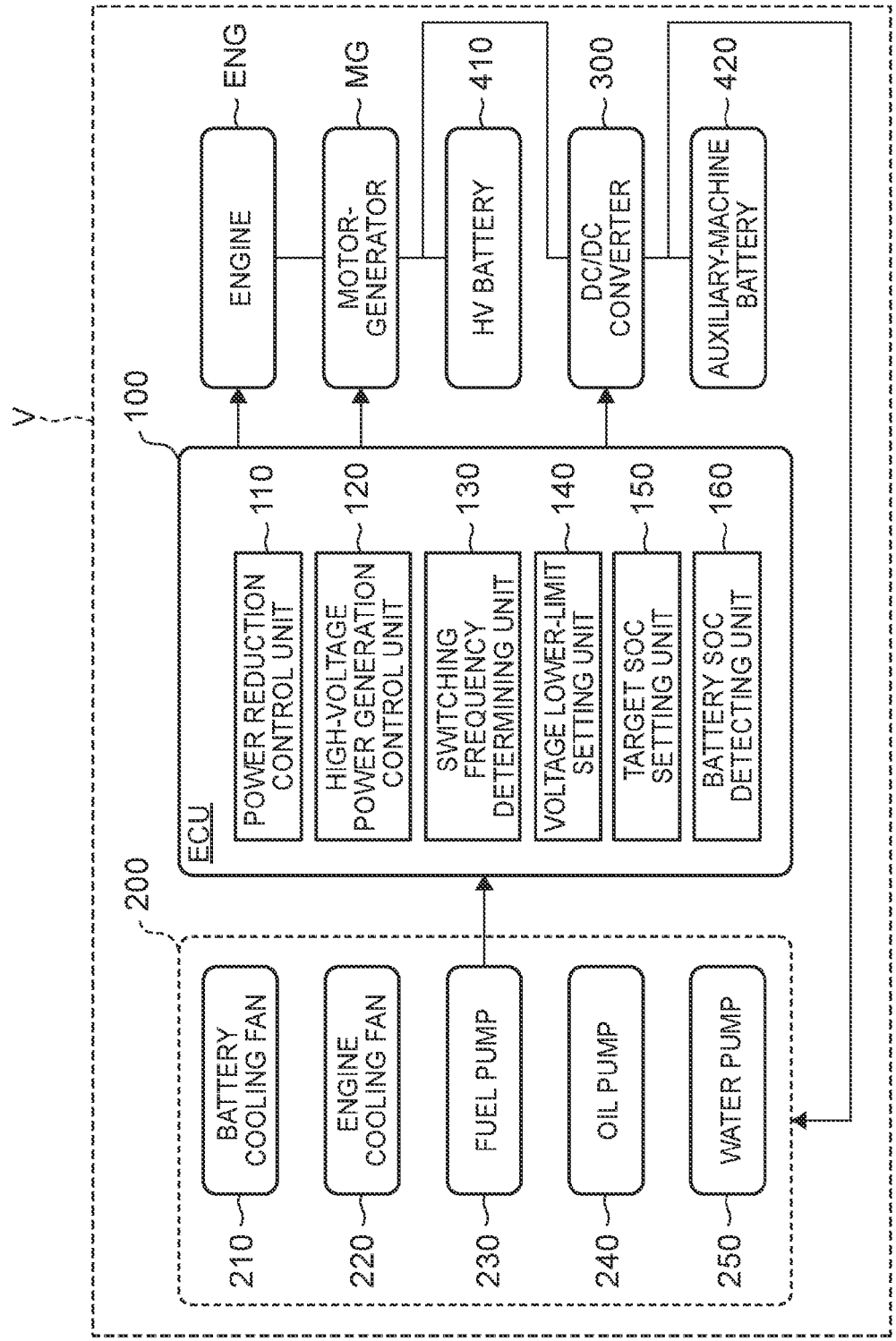
FIG. 1 is a schematic view showing the overall configuration of a hybrid vehicle according to one embodiment.

A power supply control system according to one embodiment is configured to be installed on a vehicle, such as a hybrid vehicle, including a generator and a power storage unit. The generator is in the form of an alternator or a motor-generator, for example. The power storage unit is in the form of a lead battery or a nickel-hydrogen battery, for example, and functions as an electric power supply source that supplies electric power for driving one or more auxiliary machines installed on the vehicle. The power storage unit may have a single-power-supply arrangement that consists of a single battery, or a plural-power-supply arrangement that consists of two or more batteries.

The power supply control system according to the embodiment is able to perform auxiliary-machine power reduction control by means of a first controller. More specifically, the first controller sets generated voltage of the generator so as to reduce an average value of voltages applied to the auxiliary machines (in other words, a value of voltage applied to the auxiliary machines as a whole). In this connection, the "generated voltage" means voltage applied to the auxiliary machines by use of electric power generated by the generator, and may not be the generated voltage of the generator itself. For example, when the voltage of electric power generated by the generator is applied to the auxiliary machines after being stepped down by a converter, or the like, the voltage that has been stepped down is deemed as the generated voltage. With the auxiliary-machine power reduction control, electric power consumed by the auxiliary machines can be reduced due to reduction of the average voltage. Under the auxiliary-machine power reduction control, the generated voltage of the generator is controlled to within the range of 12.5V to 13.5V, for example.

The power supply control system according to the embodiment is also able to perform high-voltage power generation control by means of a second controller. More specifically, when the auxiliary machines perform high-load operation (for example, when a cooling fan is driven at a high load), the second controller inhibits the first controller from performing the auxiliary-machine power reduction control, so as to make the generated voltage of the generator higher than the voltage during the auxiliary-machine power reduction control. With the high-voltage power generation control, it is possible to supply sufficient electric power even when the auxiliary machines perform high-load operation. In other words, the "high-load operation" mentioned herein means a condition in which the load of the auxiliary machines is such a high level that sufficient electric power cannot be supplied under the auxiliary-machine power reduction control. Under the high-voltage power generation control, the generated voltage of the generator is controlled to, for example, 13.8V.

As described above, the auxiliary-machine power reduction control by the first controller and the high-voltage power generation control by the second controller are alternately carried out. According to this embodiment, in particular, it is determined by a frequency determining unit whether the frequency of switching between the auxiliary-machine power reduction control and the high-voltage power generation control is equal to or higher than a predetermined frequency. The "predetermined frequency" mentioned herein is a threshold value used for determining that switching between the auxiliary-machine power reduction control and the high-voltage power generation control occurs at such a high frequency that the power storage unit that will be described later deteriorates. For example, the "predetermined frequency" is set in advance to the optimum value by priori simulation, or the like.

The frequency determining unit may determine not only whether the current frequency of switching between the auxiliary-machine power reduction control and the high-voltage power generation control is equal to or higher than the predetermined frequency, but also whether the frequency of switching between the auxiliary-machine power reduction control and the high-voltage power generation control will be equal to or higher than the predetermined frequency in the future. Namely, the frequency determining unit may estimate the frequency of switching between the auxiliary-machine power reduction control and the high-voltage power generation control after a given period, using various parameters, etc. of the vehicle, and determine whether the estimated frequency is equal to or higher than the predetermined frequency.

If the frequency determining unit determines that the frequency of switching between the auxiliary-machine power reduction control and the high-voltage power generation control is equal to or higher than the predetermined frequency, a lower-limit voltage setting unit sets the lower-limit voltage of the generator under the auxiliary-machine power reduction control to a higher value than that in the case where the switching frequency is lower than the predetermined frequency. Where the lower-limit voltage in the case where the switching frequency is lower than the predetermined frequency is 12.5V, the lower-limit voltage setting unit sets the lower-limit voltage in the case where the switching frequency is equal to or higher than the predetermined frequency to 13.1V.

In particular, if the auxiliary-machine power reduction control under which the generated voltage is relatively low, and the high-voltage power generation control under which the generated voltage is relatively high, are switched at a high frequency, large charge/discharge current is generated in the power storage unit, due to a difference in the generated voltage. If large charge/discharge current is generated in the power storage unit, deterioration of the power storage unit may be accelerated, and the lifetime may be reduced.

As described above, when the frequency of switching between the auxiliary-machine power reduction control and the high-voltage power generation control is equal to or higher than the predetermined frequency, the lower-limit voltage of the generator under the auxiliary-machine power reduction control is set to a high value. If the lower-limit voltage is set in this manner, a voltage variation that arises upon switching between the auxiliary-machine power reduction control and the high-voltage power generation control can be reduced. More specifically, if the generated voltage under the high-voltage power generation control is 13.8V, and the lower-limit voltage is 12.5V when the switching frequency is lower than the predetermined frequency, for example, the generated voltage is reduced by 1.3V at a maximum, at the time of switching from the high-voltage power generation control to the auxiliary-machine power reduction control. On the other hand, if the lower-limit voltage in the case where the switching frequency is equal to or higher than the predetermined frequency is set to 13.1V, the generated voltage is reduced only by 0.7V at a maximum.

If the voltage variation at the time of switching from the high-voltage power generation control to the auxiliary-machine power reduction control can be reduced, increase of discharge current caused by the voltage variation can be suppressed. Also, if the discharge current is reduced or kept small, the charge amount of the power storage unit is less likely to be reduced, so that charge current can also be reduced or kept small. Thus, if the lower-limit voltage of the auxiliary-machine power reduction control is set high, charge or discharge of the power storage unit, which occurs at the time of switching between the auxiliary-machine power reduction control and the high-voltage power generation control, can be favorably suppressed or controlled.

The vehicle may include an internal combustion engine, such as a gasoline engine or a diesel engine. The internal combustion engine is cooled by a coolant in a water jacket. The coolant is arranged to be cooled and circulated by a radiator, or the like, having a cooling fan. Also, the temperature of the coolant can be detected by a temperature sensor, or the like.

If the temperature of the coolant of the internal combustion engine becomes high, the cooling fan as an auxiliary machine is driven at a high load (namely, performs high-load operation), so as to enhance a heat dissipation effect of the radiator that cools the coolant. If the auxiliary machine performs high-load operation, electric power for driving the auxiliary machine is increased, and the high-voltage power generation control is requested. Thus, when the temperature of the coolant of the internal combustion engine is high, the frequency of switching between the auxiliary-machine power reduction control and the high-voltage power generation control is expected to be increased.

According to this embodiment, the frequency of switching between the auxiliary-machine power reduction control and the high-voltage power generation control is determined, based on the temperature of the coolant of the internal combustion engine. More specifically, when the water temperature of the coolant of the internal combustion engine is equal to or higher than a predetermined first temperature, it is determined that the frequency of switching between the auxiliary-machine power reduction control and the high-voltage power generation control becomes equal to or higher than the predetermined frequency. In this connection, the "first temperature" is a threshold value corresponding to the temperature of the coolant of the engine in the case where the frequency of switching between the auxiliary-machine power reduction control and the high-voltage power generation control becomes equal to the predetermined frequency. If the first temperature is set in advance, it can be easily and accurately determined whether the switching frequency becomes equal to or higher than the predetermined frequency, by using the temperature of the coolant of the internal combustion engine.

There arises a time lag between the time when the temperature of the coolant of the internal combustion engine becomes high, and the time when the frequency of switching between the auxiliary-machine power reduction control and the high-voltage power generation control becomes equal to the predetermined frequency. Therefore, if the temperature of the coolant of the engine is used, it can be determined not only whether the current switching frequency is equal to or higher than the predetermined frequency, but also whether the switching frequency will be equal to or higher than the predetermined frequency in the future.

The vehicle may include an electric machine, such as a motor. Where the generator is a motor-generator, the generator may also function as an electric motor. A battery, such as a lithium-ion battery, may be included as an electric power supply source of the electric motor. The temperature of the battery can be detected by a temperature sensor, or the like.

If the temperature of the battery becomes high, a cooling fan for cooling the battery is driven at a high load (namely, performs high-load operation). If the auxiliary machine performs high-load operation, electric power for driving the auxiliary machine is increased, and the high-voltage power generation control is requested. Thus, when the temperature of the battery is high, the frequency of switching between the auxiliary-machine power reduction control and the high-voltage power generation control is expected to be increased.

Accordingly, the frequency of switching between the auxiliary-machine power reduction control and the high-voltage power generation control is determined, based on the temperature of the battery. More specifically, when the temperature of the battery is equal to or higher than a predetermined second temperature, it is determined that the frequency of switching between the auxiliary-machine power reduction control and the high-voltage power generation control becomes equal to or higher than the predetermined frequency. In this connection, the "second temperature" is a threshold value corresponding to the temperature of the battery in the case where the frequency of switching between the auxiliary-machine power reduction control and the high-voltage power generation control becomes equal to the predetermined frequency. If the second temperature is set in advance, it can be easily and accurately determined whether the switching frequency becomes equal to or higher than the predetermined frequency, by using the temperature of the battery.

Also, there arises a time lag between the time when the temperature of the battery becomes high, and the time when the frequency of switching between the auxiliary-machine power reduction control and the high-voltage power generation control becomes equal to the predetermined frequency. Therefore, if the temperature of the battery is used, it can be determined not only whether the current switching frequency is equal to or higher than the predetermined frequency, but also whether the switching frequency will be equal to or higher than the predetermined frequency in the future.

Also, a setting unit may set a target charge amount as a target value of the charge amount of the power storage unit. The target charge amount is set according to traveling conditions and surrounding environment of the vehicle, for example. However, the target charge amount may be set as a fixed value. Also, a detecting unit may detect the current charge amount of the power storage unit. The detecting unit detects the current charge amount, based on the voltage of the power storage unit, for example.

In particular, the lower-limit voltage setting unit sets the lower-limit voltage (namely, the lower-limit voltage of the auxiliary-machine power reduction control when the frequency of switching between the auxiliary-machine power reduction control and the high-voltage power generation control is determined as being equal to or higher than the predetermined frequency), based on the above-described target charge amount and the current charge amount. More specifically, when the current charge amount is larger than the target charge amount, the lower-limit voltage is set to a lower value than the open voltage of the power storage unit. In this case, electric power is discharged from the power storage unit, so that the charge amount is reduced, and approaches the target charge amount. When the current charge amount is equal to the target charge amount, the lower-limit voltage is set to the same value as the open voltage of the power storage unit. In this case, the power storage unit is neither charged nor discharged, and the current charge amount is kept being equal to the target charge amount. Further, when the current charge amount is smaller than the target charge amount, the lower-limit voltage is set to a higher value than the open voltage of the power storage unit. In this case, the power storage unit is charged, so that the charge amount is increased, and approaches the target charge amount.

The above statement that "the current charge amount is equal to the target charge amount" may mean not only the case where the current charge amount and the target charge amount completely coincide with each other, but also the case where the current charge amount is within a given range including the target charge amount and its margin(s). In this case, the statement that "the current charge amount is larger than the target charge amount" means the case where the current charge amount is larger than those within the given range, and the statement that "the current charge amount is smaller than the target charge amount" means the case where the current charge amount is smaller than those within the given range.

Referring to the drawings, one embodiment will be described. In the following, the case where a power supply control system of the embodiment is installed on a hybrid vehicle will be described by way of example.

<Configuration of Hybrid Vehicle> Initially, the configuration of the hybrid vehicle according to this embodiment will be described with reference to FIG. 1. FIG. 1 schematically shows the overall configuration of the hybrid vehicle according to this embodiment.

In FIG. 1, the hybrid vehicle V according to this embodiment includes an ECU (Electronic Control Unit) 100, auxiliary machines 200, engine ENG, motor-generator MG, DC/DC converter 300, HV battery 410, and an auxiliary-machine battery 420. The hybrid vehicle V is configured to travel in a selected one of an HV traveling mode in which it travels with power of the engine ENG and the motor-generator MG, and an EV traveling mode in which it travels only with power of the motor-generator MG while stopping the engine ENG.

The ECU 100 is an electronic control unit configured to be able to control the whole operation of the hybrid vehicle V. In this embodiment, in particular, the ECU 100 functions as one specific example of the "power supply control system". More specifically, the ECU 100 controls the operation of the DC/DC converter 300, so as to control voltage applied to the auxiliary-machine battery 420. In the case where the power supply control system is used in a vehicle other than the hybrid vehicle, the ECU 100 may directly control a generator, such as an alternator. The specific configuration of the ECU 100 will be described in detail later.

The auxiliary machines 200 include a battery cooling fan 210, engine cooling fan 220, fuel pump 230, oil pump 240, and a water pump 250.

The battery cooling fan 210 is constructed as a fan for cooling the HV battery 410. The battery cooling fan 210 can be driven according to the temperature of the HV battery 410. For example, the battery cooling fan 210 is driven at a low load when the temperature of the HV battery 410 is low, and is driven at a high load when the temperature of the HV battery 410 is high. The battery cooling fan 210 may also be driven only when the temperature of the HV battery 410 is high.

The engine cooling fan 220 is constructed as a fan for cooling the engine ENG. More specifically, the engine cooling fan 220 is constructed as a fan for cooling a radiator through which the coolant of the engine ENG circulates. The engine cooling fan 220 can be driven according to the temperature of the coolant of the engine ENG. For example, the engine cooling fan 220 is driven at a low load when the temperature of the coolant is low, and is driven at a high load when the temperature of the coolant is high. The engine cooling fan 220 may also be driven only when the temperature of the coolant is high.

The fuel pump 230 is constructed as a pump for supplying fuel, such as gasoline, to the engine ENG.

The oil pump 240 is constructed as a pump for supplying oil to each part (e.g., a transmission (not shown)) of the hybrid vehicle V.

The water pump 250 is constructed as a pump for circulating the coolant of the engine ENG.

Each of the above-mentioned auxiliary machines is a mere example, and the auxiliary machines 200 may include other auxiliary machines that are not mentioned herein. Namely, effects that are obtained by the power supply control system according to this embodiment and will be described later are not limited depending on the types of the auxiliary machines.

The engine ENG is one specific example of the "internal combustion engine", and is driven by burning fuel, such as gasoline or light oil. The engine ENG functions as a main power source of the hybrid vehicle V. In addition, the engine ENG also functions as a power source for rotating (in other words, driving) a rotary shaft of the motor-generator MG.

The motor-generator MG is one specific example of the "generator", and functions as a generator for charging the HV battery 410 and the auxiliary-machine battery 420. The motor-generator MG may also function as an electric motor that supplies power for running the hybrid vehicle V, when it is driven using electric power stored in the HV battery 410.

The DC/DC converter 300 is electrically connected between the motor-generator MG and the HV battery 410, and steps down voltage of electric power obtained through regeneration of the motor-generator MG, or voltage delivered from the HV battery 410, so as to deliver the resulting voltage to the auxiliary-machine battery 420.

The HV battery 410 is one specific example of the "battery", and functions as an electric power supply source that supplies electric power as power to the motor-generator MG, and as a power storage unit that stores electric power obtained through regeneration of the motor-generator MG. More specifically, the HV battery 410 is a rechargeable secondary battery unit, and consists principally of a plurality of unit cells, such as lithium-ion battery cells, connected in series, for example.

The auxiliary-machine battery 420 is one specific example of the "power storage unit", and functions as an electric power supply source that supplies electric power for driving the auxiliary machines 200 installed on the hybrid vehicle V. Also, the auxiliary-machine battery 420 can be charged with electric power delivered from the motor-generator MG and the HV battery 410, via the DC/DC converter 300.

<Configuration of ECU> Referring to FIG. 1, the specific configuration of the ECU 100 will be described.

As shown in FIG. 1, the ECU 100 includes a power reduction control unit 110, high-voltage power generation control unit 120, switching frequency determining unit 130, voltage lower-limit value setting unit 140, target SOC setting unit 150, and a battery SOC detecting unit 160, as logical or physical processing blocks realized therein.

The power reduction control unit 110 is one specific example of the "first controller", and performs auxiliary-machine power reduction control for reducing electric power for driving the auxiliary machines 200. More specifically, the power reduction control unit 110 controls the DC/DC converter 300 so as to reduce the average value of voltage applied to the auxiliary machines 200. The auxiliary-machine power reduction control makes it possible to reduce electric power consumed by the auxiliary machines 200, by reducing the average voltage.

The high-voltage power generation control unit 120 is one specific example of the "second controller", and performs high-voltage power generation control for obtaining higher voltage than that under the auxiliary-machine power reduction control. More specifically, when any of the auxiliary machines 200 operates at a high load (for example, during HIGH driving of the battery cooling fan 210 or the engine cooling fan 220), the high-voltage power generation control unit 120 inhibits the power reduction control unit 110 from performing the auxiliary-machine power reduction control, and increases the voltage delivered from the DC/DC converter 300. With the high-voltage power generation control, it is possible to supply sufficient electric power even when the auxiliary machines 200 perform high-load operation.

The switching frequency determining unit 130 is one specific example of the "frequency determining unit", and determines whether the frequency of switching between the auxiliary-machine power reduction control and the high-voltage power generation control is equal to or higher than a predetermined frequency. The switching frequency determining unit 130 is able to estimate the frequency of switching between the auxiliary-machine power reduction control and the high-voltage power generation control, by predicting the load of the battery cooling fan 210 based on the temperature of the HV battery 410, for example. The switching frequency determining unit 130 is also able to estimate the frequency of switching between the auxiliary-machine power reduction control and the high-voltage power generation control, by predicting the load of the engine cooling fan 220 based on the water temperature of the coolant of the engine ENG.

The threshold value stored for use in determination by the switching frequency determining unit 130 is a value for determining increase of charge/discharge current, which would cause reduction of the lifetime of the auxiliary-machine battery 420. This threshold value is determined by priori simulation, for example.

The voltage lower-limit setting unit 140 is one specific example of the "lower-limit value setting unit". When it is determined by the switching frequency determining unit 130 that the frequency of switching between the auxiliary-machine power reduction control and the high-voltage power generation control is equal to or higher than the predetermined frequency, the voltage lower-limit setting unit 140 sets the lower limit of the auxiliary-machine power reduction control to a value higher than a normal lower limit. As will be described in detail later, the voltage lower-limit setting unit 140 is configured to be able to set the lower limit to different values, based on the relationship between the current SOC of the auxiliary-machine battery 420 and a target SOC.

The target SOC setting unit 150 is one specific example of the "setting unit", and sets the target SOC as a target value of the SOC of the auxiliary-machine battery 420. The target SOC is set according to traveling conditions and surrounding environment of the hybrid vehicle V, for example. The target SOC may also be set as a fixed value.

The battery SOC detecting unit 160 is one specific example of the "detecting unit", and detects the current SOC of the auxiliary-machine battery 420. The battery SOC detecting unit 160 detects the current SOC, based on the voltage of the auxiliary-machine battery 420, for example.

Figure 2:
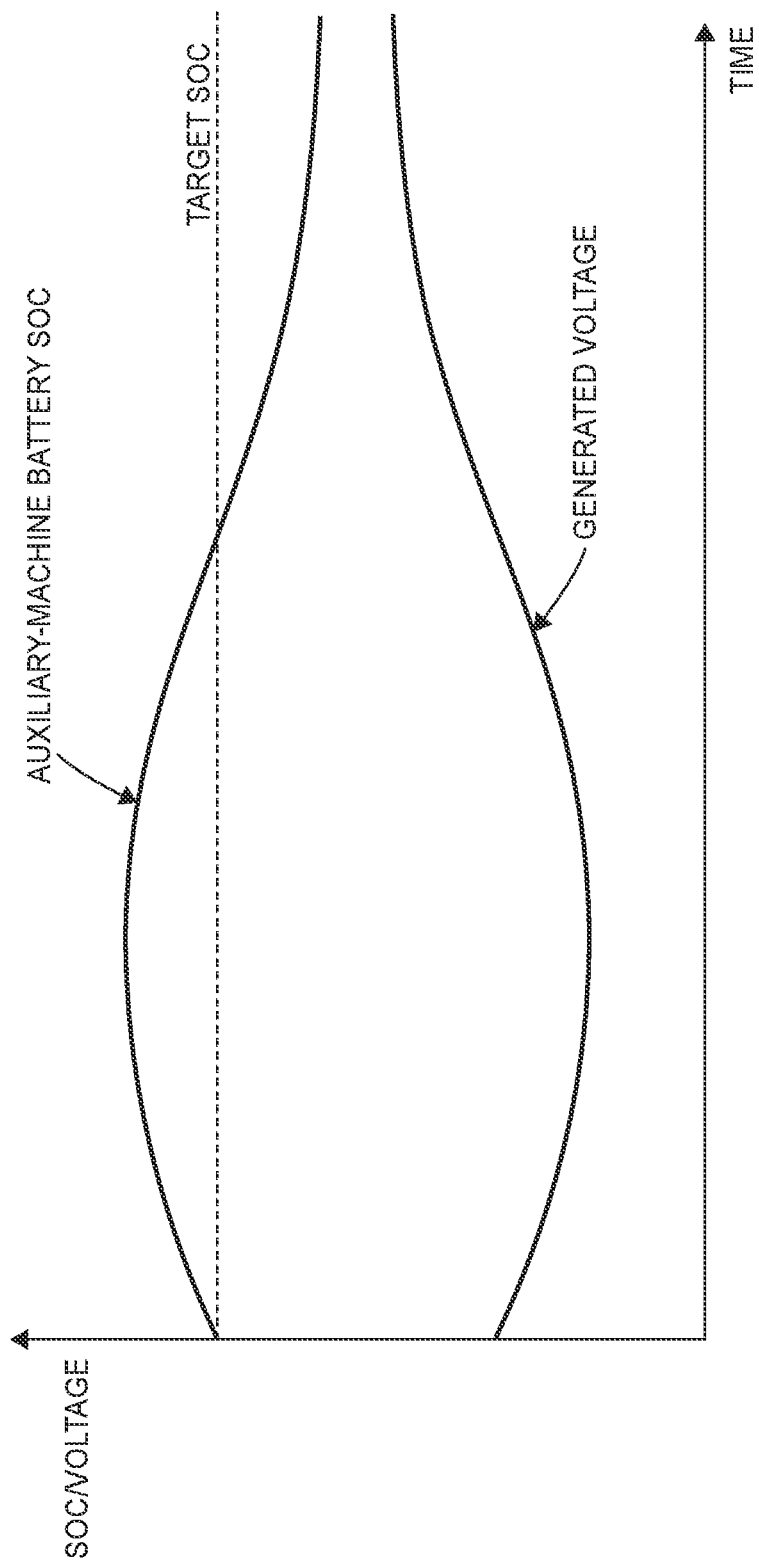
FIG. 2 is a time chart indicating a method of controlling generated voltage under power reduction control.

<Auxiliary-Machine Power Reduction Control> Referring next to FIG. 2, the auxiliary-machine power reduction control performed by the power reduction control unit 110 will be described in detail. FIG. 2 is a time chart indicating a method of controlling generated voltage under the power reduction control.

As shown in FIG. 2, during the auxiliary-machine power reduction control, the power reduction control unit 110 determines the output voltage of the DC/DC converter 300 (which will be called "generated voltage" when appropriate) according to the SOC of the auxiliary-machine battery 420. More specifically, the power reduction control unit 110 determines the generated voltage as a relatively low value when the SOC of the auxiliary-machine battery 420 is higher than the target SOC, and determines the generated voltage as a relatively high value when the SOC of the auxiliary-machine battery 420 is lower than the target SOC. If the generated voltage is controlled in this manner, electric power can be discharged from the auxiliary-machine battery 420 when the SOC of the auxiliary-machine battery 420 is higher than the target SOC, and the auxiliary-machine battery 420 can be charged when the SOC of the auxiliary-machine battery 420 is lower than the target SOC. Accordingly, the SOC of the auxiliary-machine battery 420 can be kept at values close to the target SOC.

During the auxiliary-machine power reduction control, the generated voltage is controlled to within a predetermined range (e.g., 12.5V to 13.5V). The voltage control range of the auxiliary-machine power reduction control is set to be lower than the voltage established under the high-voltage power generation control which will be described later, so that the average voltage of the auxiliary machines 200 is reduced. Thus, with the auxiliary-machine power reduction control, electric power consumed by the auxiliary machines 200 can be favorably reduced.

Figure 3:
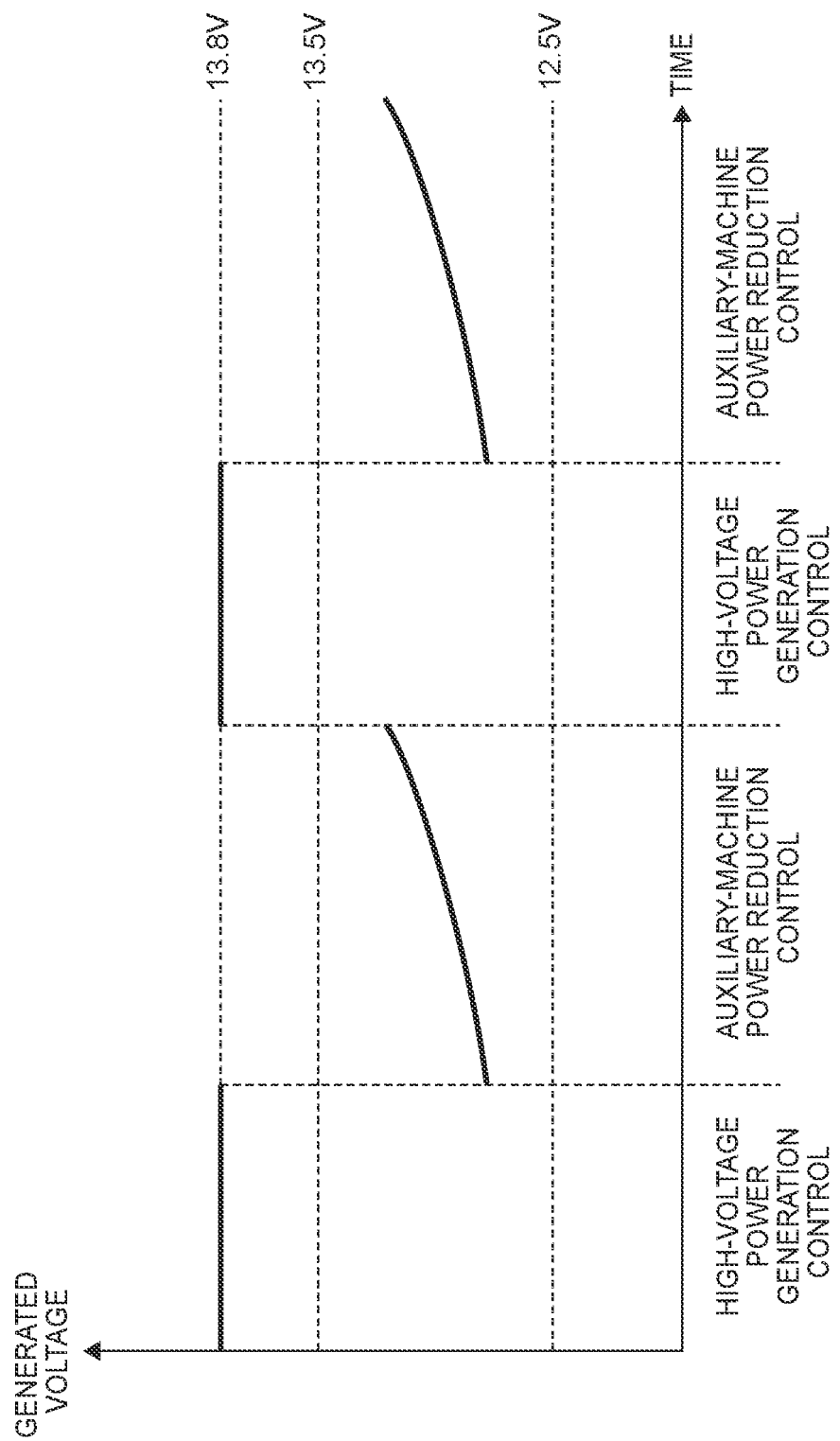
FIG. 3 is a time chart indicating variations in generated voltage under power reduction control and high-voltage power generation control.

<High-Voltage Power Generation Control> Referring next to FIG. 3, the high-voltage power generation control performed by the high-voltage power generation control unit 120 will be described in detail. FIG. 3 is a time chart showing variations in the generated voltage under the power reduction control and the high-voltage power generation control.

As shown in FIG. 3, the high-voltage power generation control unit 120 performs high-voltage power generation control by temporarily inhibiting the auxiliary-machine power reduction control performed by the power reduction control unit 110. Therefore, the auxiliary-machine power reduction control and the high-voltage power generation control are alternately carried out. The high-voltage power generation control unit 120 performs high-voltage power generation control by keeping the generated voltage at a higher level (e.g., 13.8V) than those during the auxiliary-machine power reduction control. The high-voltage power generation control unit 120 executes high-voltage power generation control when any of the auxiliary machines 200 performs high-load operation. Since the generated voltage is kept at a relatively high level during the high-voltage power generation control, an electric power shortage can be prevented even when large electric power is requested in (by) the group of auxiliary machines 200.

As is understood from FIG. 3, the generated voltage undergoes a large variation at the time of switching between the high-voltage power generation control and the auxiliary-machine power reduction control. In particular, at the time of switching from the high-voltage power generation control to the auxiliary-machine power reduction control, which switching occurs immediately after the auxiliary-machine battery 420 is charged under the high-voltage power generation control, the generated voltage under the auxiliary-machine power reduction control is low, and the voltage variation is large.

If the voltage variation as described above is produced, charge/discharge current of the auxiliary-machine battery 420 becomes large. For example, the voltage is rapidly lowered at the time of switching from the high-voltage power generation control to the auxiliary-machine power reduction control. Therefore, large discharge current is generated in the auxiliary-machine battery 420. The increase of the charge/discharge current in the auxiliary-machine battery 420 accelerates deterioration of the battery 420, and induces reduction of the lifetime of the battery 420. Accordingly, it is preferable that the frequency of switching between the auxiliary-machine power reduction control and the high-voltage power generation control is as small as possible.

In the power supply control system according to this embodiment, lower-limit setting control as described in detail below is carried out, so as to curb reduction of the lifetime of the auxiliary-machine battery as described above.

Figure 4:
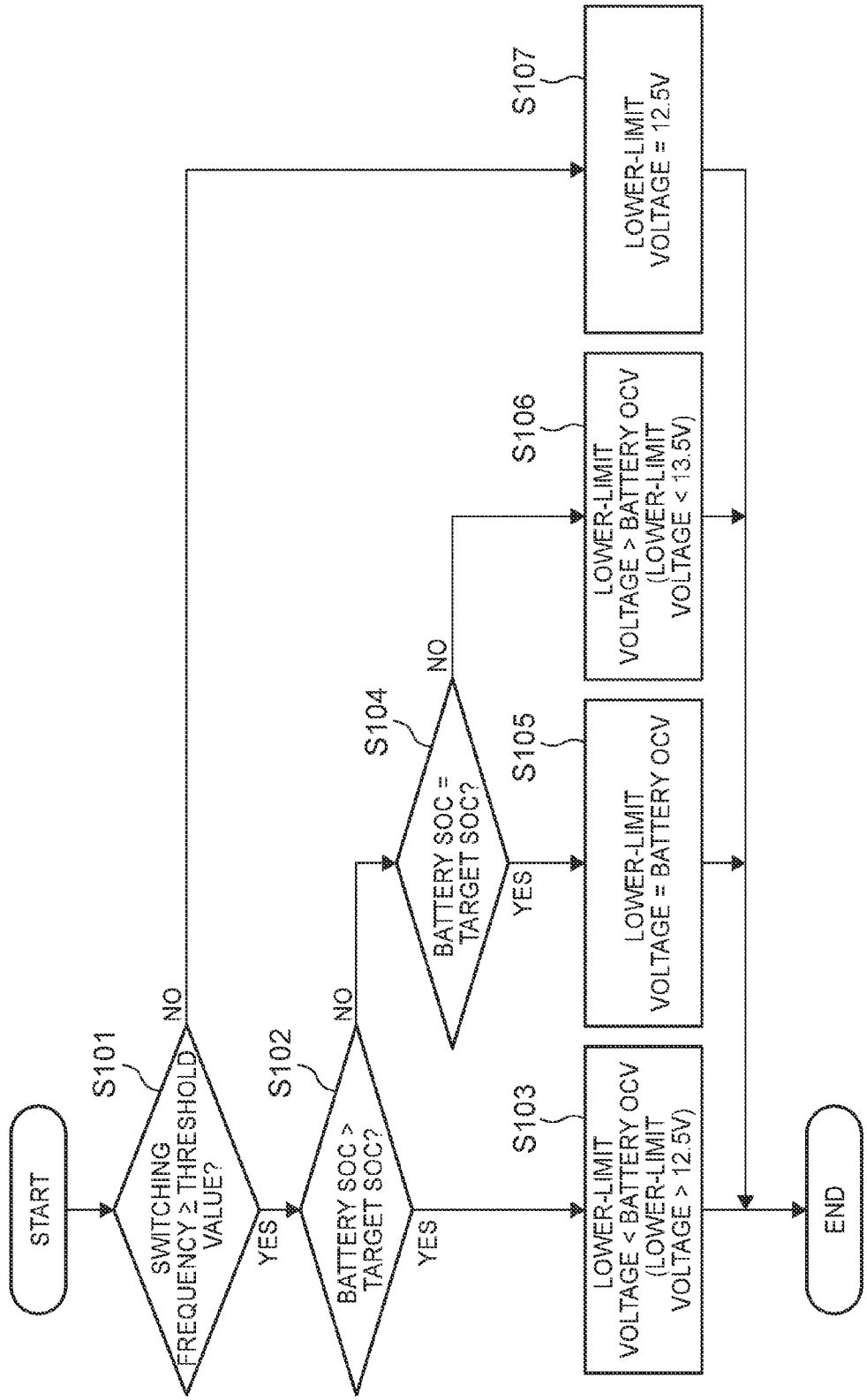
FIG. 4 is a flowchart illustrating flow of operation of lower-limit setting control.

<Lower-Limit Setting Control> Referring to FIG. 4, the lower-limit setting control performed by the switching frequency determining unit 130 and the voltage lower-limit setting unit 140 will be described in detail. FIG. 4 is a flowchart illustrating the flow of operation of the lower-limit setting control.

In FIG. 4, under the lower-limit setting control, it is initially determined by the switching frequency determining unit 130 whether the frequency of switching between the auxiliary-machine power reduction control and the high-voltage power generation control is equal to or higher than a predetermined threshold value (step S101). The threshold value mentioned herein is one specific example of the "predetermined frequency", and is set in advance as a value corresponding to the frequency in the case where reduction of the lifetime of the auxiliary-machine battery 420 as described above occurs (more specifically, the degree of deterioration of the auxiliary-machine battery 420 reaches an unacceptable value). As already described above, the switching frequency determining unit 130 may estimate the frequency of switching between the auxiliary-machine power reduction control and the high-voltage power generation control, based on the temperature of the HV battery 410, or the temperature of the coolant of the engine ENG, for example.

If it is determined that the frequency of switching between the auxiliary-machine power reduction control and the high-voltage power generation control is lower than the predetermined threshold value (step S101: NO), the lower-limit voltage under the auxiliary-machine power reduction control is set to 12.5V as the lower limit of the normal control range (step S107). In other words, setting (change) of the lower limit may not be performed by the voltage lower-limit setting unit 140.

On the other hand, if it is determined that the frequency of switching between the auxiliary-machine power reduction control and the high-voltage power generation control is equal to or higher than the predetermined threshold value (step S101: YES), it is determined by the voltage lower-limit setting unit 140 whether the current SOC of the auxiliary-machine battery 420 is larger than the target SOC (step S102). In this connection, a value detected by the battery SOC detecting unit 160 may be used as the current SOC of the auxiliary-machine battery 420, and a value set by the target SOC setting unit 150 may be used as the target SOC.

If it is determined that the current SOC of the auxiliary-machine battery 420 is larger than the target SOC (step S102: YES), the voltage lower-limit setting unit 140 sets the lower-limit voltage under the auxiliary-machine power reduction control, to a value that is lower than the OCV of the auxiliary-machine battery 420, and is higher than 12.5V as the lower limit of the normal control range (step S103).

On the other hand, if it is determined that the current SOC of the auxiliary-machine battery 420 is not larger than the target SOC (step S102: NO), it is further determined by the voltage lower-limit setting unit 140 whether the current SOC of the auxiliary-machine battery 420 is the same value as the target SOC (more precisely, whether the current SOC is within a given range from the target SOC) (step S104).

If it is determined that the current SOC of the auxiliary-machine battery 420 is the same value as the target SOC (step S104: YES), the voltage lower-limit setting unit 140 sets the lower-limit voltage under the auxiliary-machine power reduction control, to the same value as the OCV of the auxiliary-machine battery 420 (step S105).

On the other hand, if it is determined that the current SOC of the auxiliary-machine battery 420 is not the same value as the target SOC (namely, the current SOC of the auxiliary-machine battery 420 is smaller than the target SOC) (step S104: NO), the voltage lower-limit setting unit 140 sets the lower-limit voltage under the auxiliary-machine power reduction control, to a value that is higher than the OCV of the auxiliary-machine battery 420, and is lower than 13.5V as the upper limit of the normal control range (step S106).

As described above, when it is determined that the frequency of switching between the auxiliary-machine power reduction control and the high-voltage power generation control is equal to or higher than the predetermined threshold value (namely, when the lifetime of the auxiliary-machine battery 420 is highly likely to be reduced), the lower-limit voltage under the auxiliary-machine power reduction control is set to a value higher than 12.5V as the lower limit of the normal control range. Also, the lower-limit voltage under the auxiliary-machine power reduction control is set to a value that differs depending on the relationship in magnitude between the current SOC of the auxiliary-machine battery 420 and the target SOC.

<Description of Effects> Referring to FIG. 5 through FIG. 7, a beneficial effect obtained by the lower-limit voltage setting control as described above will be described.

Figure 5:
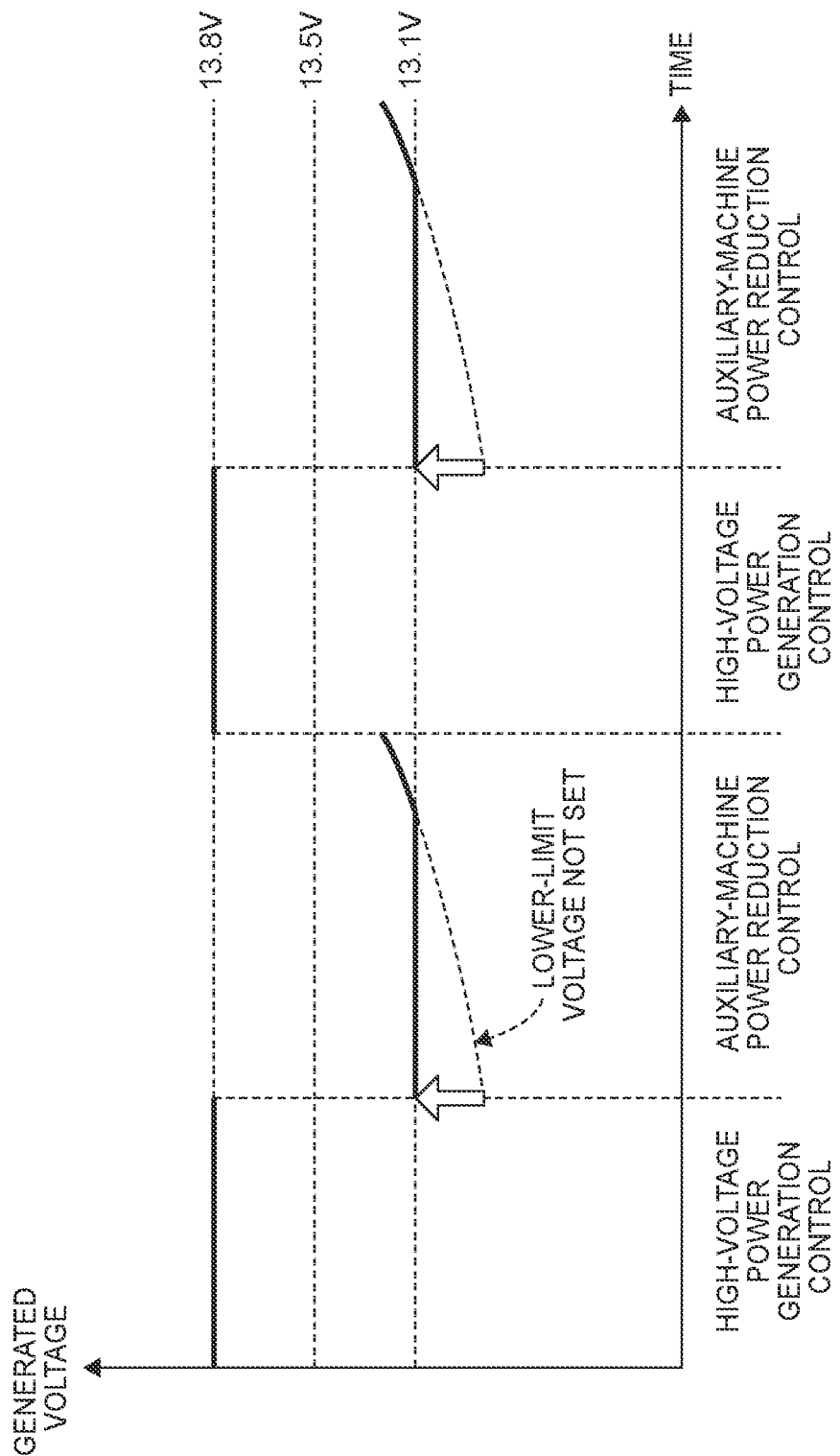
FIG. 5 is a time chart indicating variations in generated voltage when the lower-limit voltage is set.

If the lower-limit voltage of the auxiliary-machine power reduction control is set to a value (13.1V in this example) that is higher than the lower limit (12.5V) of the normal control range, as shown in FIG. 5, the voltage detected immediately after switching from the high-voltage power generation control to the auxiliary-machine power reduction control becomes higher than that in the case where the lower limit is not set. As a result, a variation in the generated voltage, which arises upon switching from the high-voltage power generation control to the auxiliary-machine power reduction control, is reduced. Accordingly, increase of discharge current of the auxiliary-machine battery 420, which would be caused by rapid reduction of the voltage, can be suppressed.

With the increase of the discharge current thus suppressed, the SOC of the auxiliary-machine battery 420 is less likely to be reduced. Therefore, the auxiliary-machine battery 420 becomes less likely to be charged, and increase of charge current is also suppressed. Namely, if the lower-limit value is set to a value higher than the lower limit of the normal control range, so that electric power is less likely to be discharged from the auxiliary-machine battery 420, the auxiliary-machine battery 420 becomes less likely to be charged, even if the upper-limit voltage is not set to a value lower than the upper-limit value of the normal control range. Consequently, increase of charge/discharge current is suppressed, and reduction of the lifetime of the auxiliary-machine battery 420 can be curbed.

Figure 6:
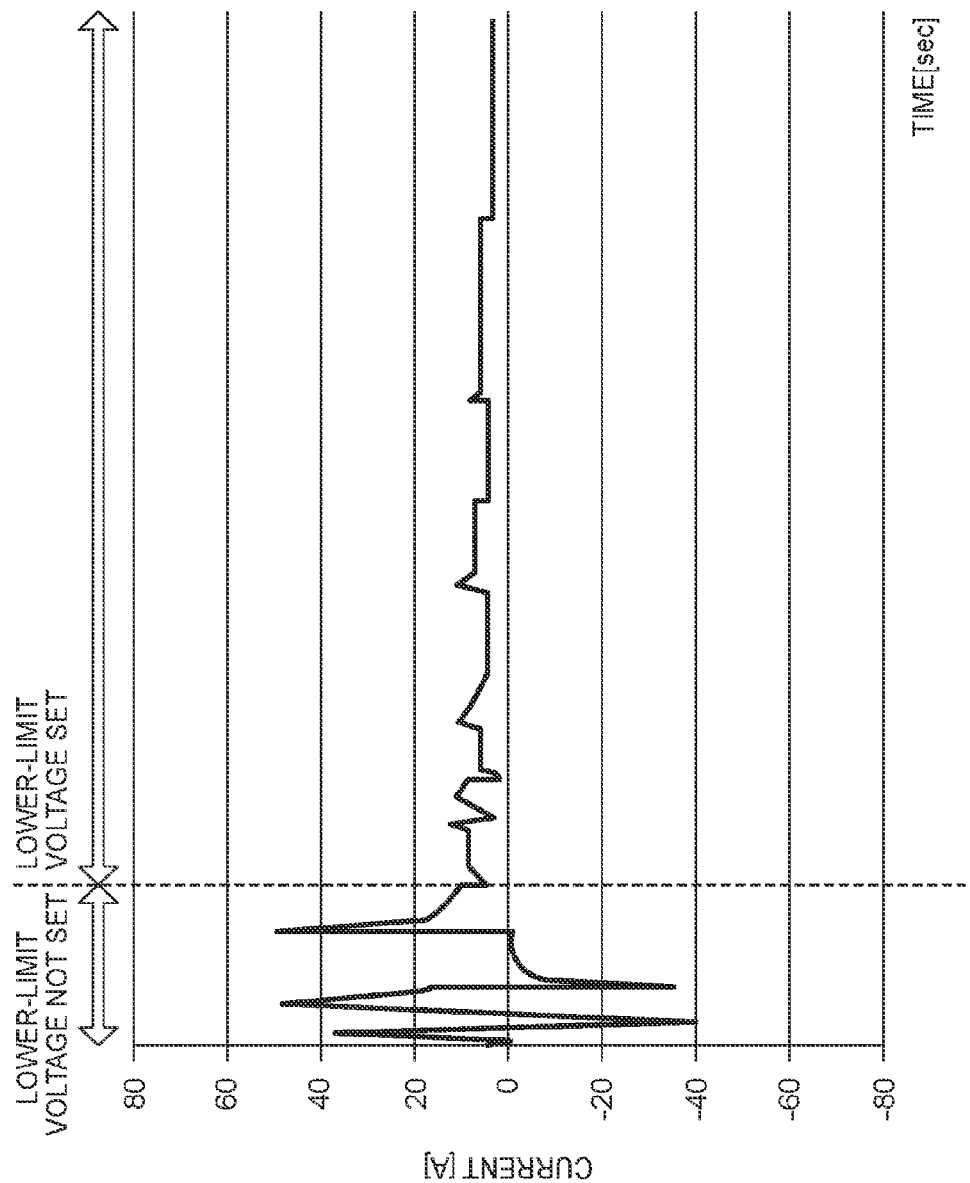
FIG. 6 is a time chart indicating change of charge/discharge current of a lead battery depending on setting of the lower-limit voltage.

As shown in FIG. 6, in the case where the auxiliary-machine battery 420 is in the form of a lead battery, if the lower-limit voltage of the auxiliary-machine power control is not set, large charge/discharge current is generated in the auxiliary-machine battery 420, due to the increased frequency of switching between the auxiliary-machine power reduction control and the high-voltage power generation control. On the other hand, if the lower-limit voltage of the auxiliary-machine power reduction control is set to 13.1V, the charge/discharge current of the auxiliary-machine battery 420 can be reduced. Since the OCV of the lead battery is lower than 13.1V when data shown in FIG. 6 is obtained, no discharge takes place in the auxiliary-machine battery 420 after setting of the lower limit, but only weak charging is performed.

Figure 7:
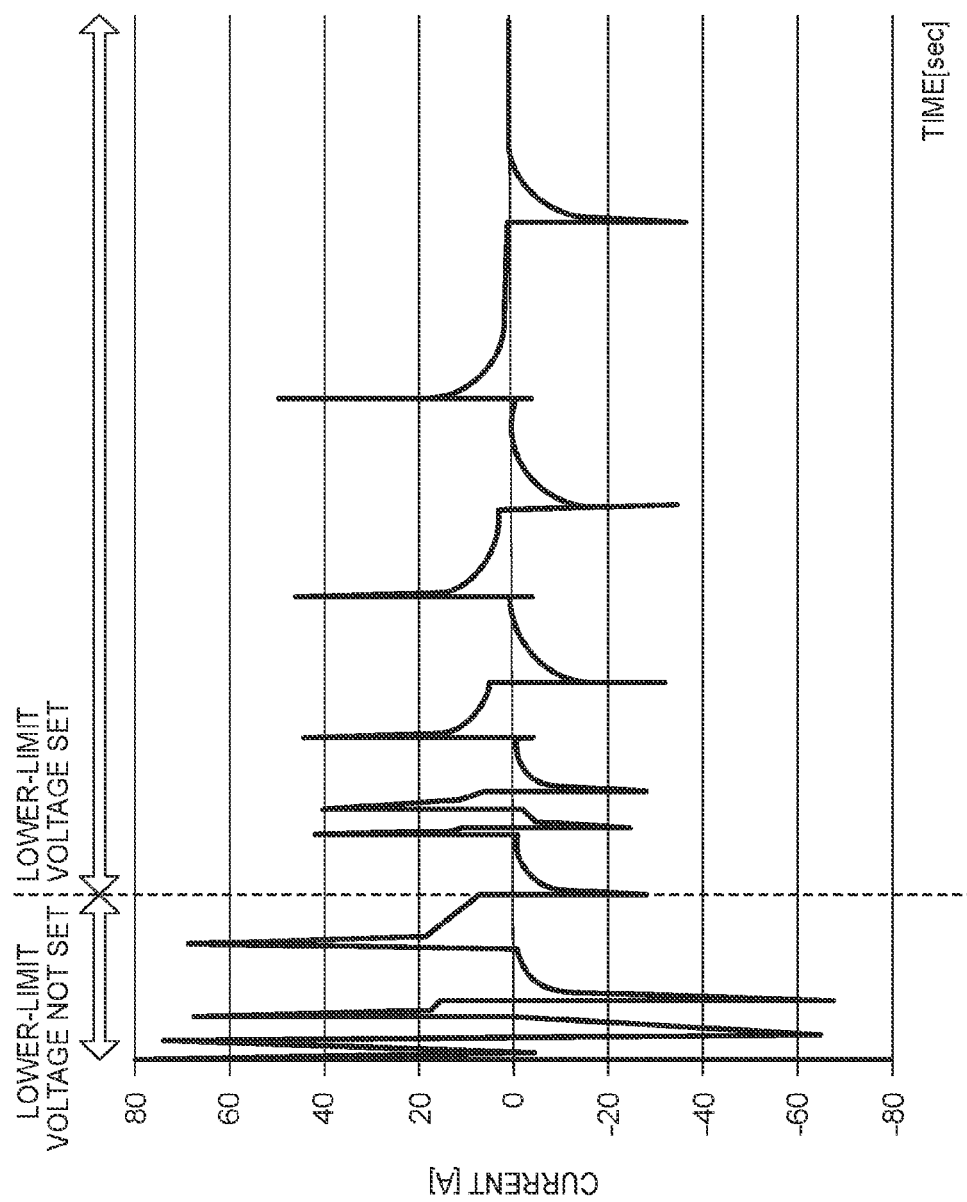
FIG. 7 is a time chart indicating change of charge/discharge current of a nickel-hydrogen battery depending on setting of the lower-limit voltage.

As shown in FIG. 7, in the case where the auxiliary-machine battery 420 is in the form of a nickel-hydrogen battery, too, if the lower-limit voltage of the auxiliary-machine power reduction control is set to 13.1V that is higher than the lower limit of the normal control range, the charge/discharge current of the auxiliary-machine battery 420 can be reduced. Since the OCV of the nickel-hydrogen battery is likely to be higher than that of the lead battery, discharge is not completely eliminated, but it is found that the charge/discharge current of the auxiliary-machine battery 420 is surely reduced, as compared with the case where the lower-limit voltage is not set.

Figure 8:
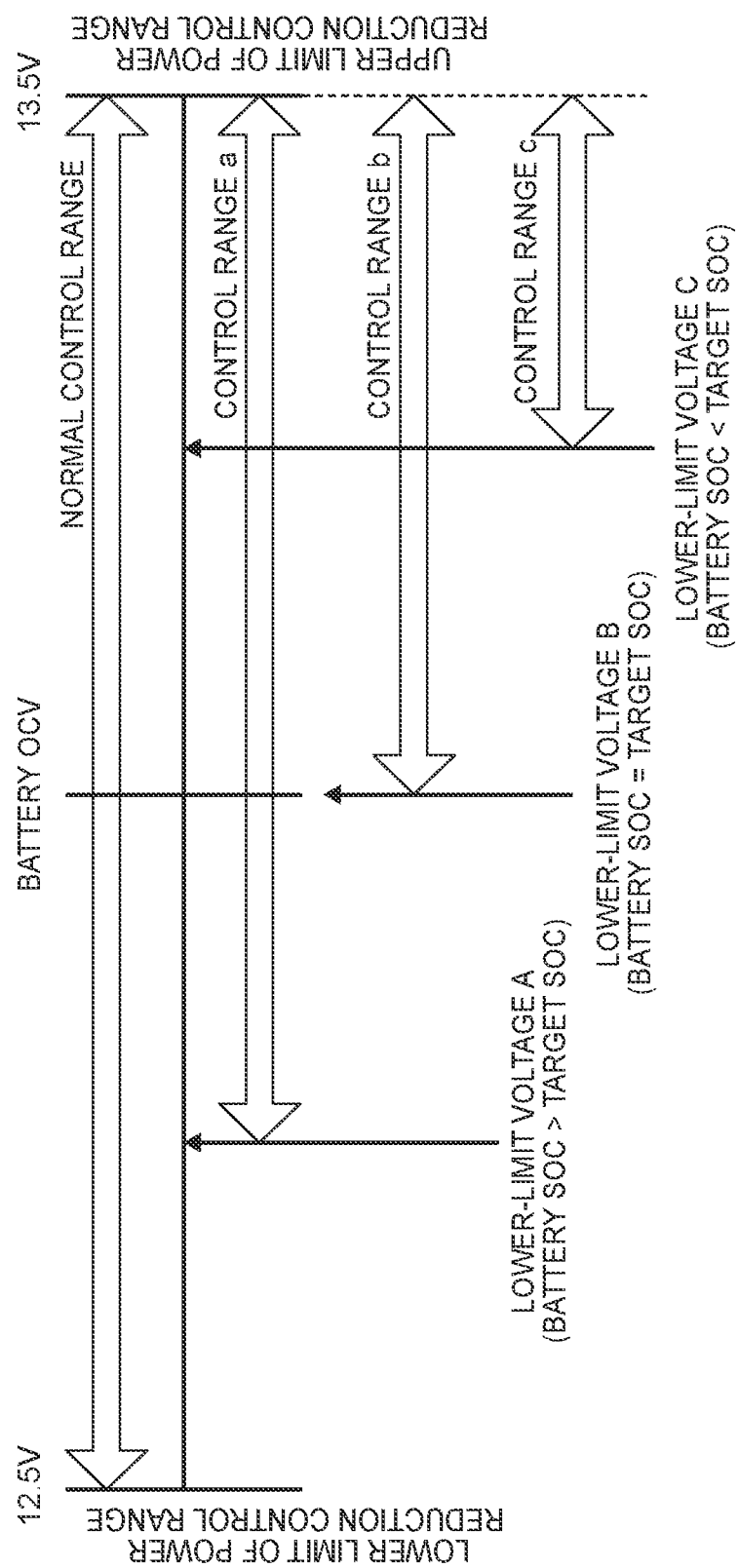
FIG. 8 is a conceptual diagram indicating a plurality of lower-limit voltages set according to a target SOC, and control ranges in the respective cases.
Figure 9:
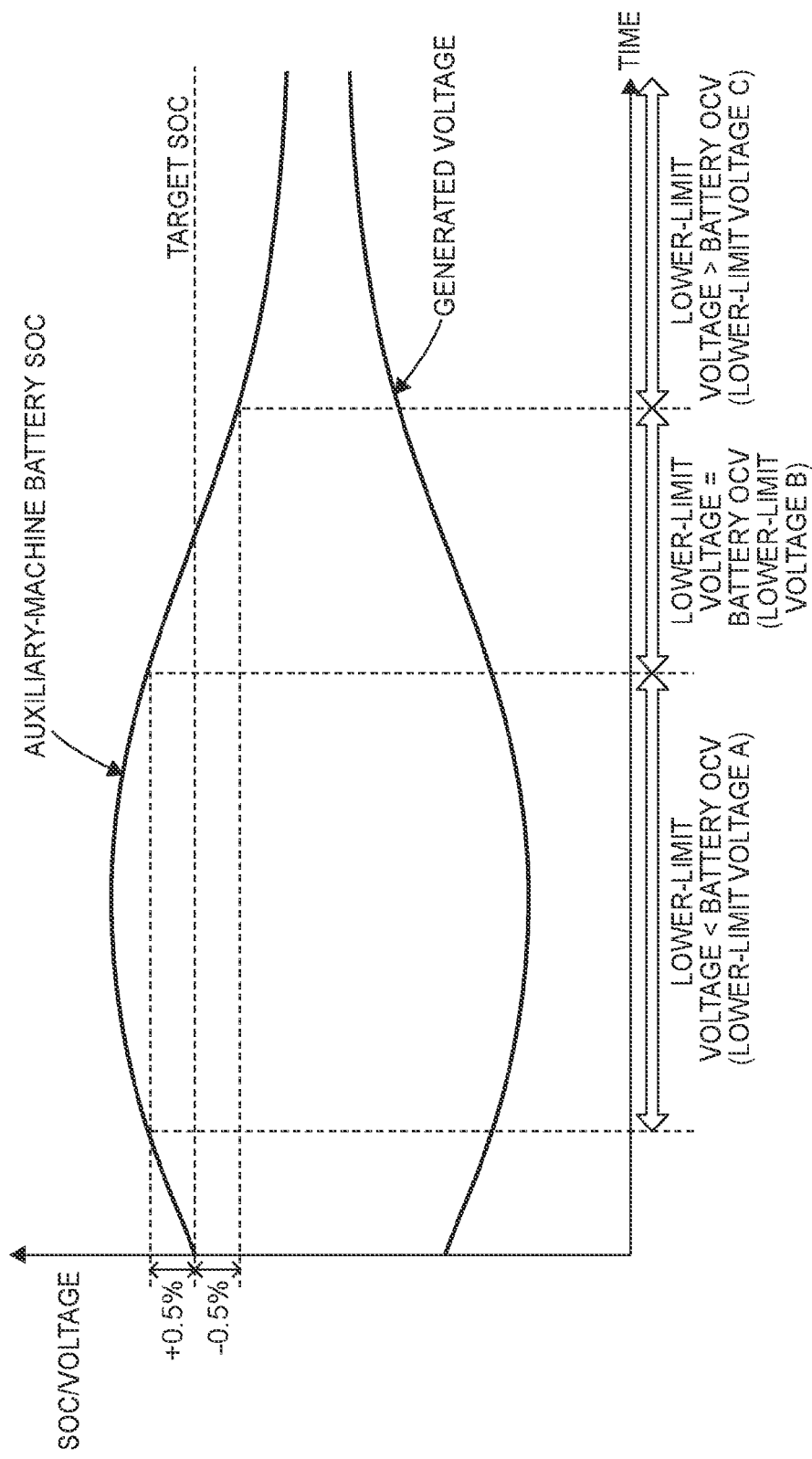
FIG. 9 is a time chart indicating the relationship between the battery SOC and the lower-limit voltage.

Referring next to FIG. 8 and FIG. 9, beneficial effects obtained by setting the lower-limit voltage according to the SOC of the auxiliary-machine battery 420 will be described. FIG. 8 is a conceptual diagram indicating a plurality of lower-limit voltages set according to the target SOC, and control ranges of the respective cases. FIG. 9 is a time chart indicating the relationship between the battery SOC and the lower-limit voltage.

As shown in FIG. 8 and FIG. 9, when the current SOC of the auxiliary-machine battery 420 is larger than the target SOC (more specifically, when the current SOC of the auxiliary-machine battery 420 is larger than the target SOC by more than +5%), the lower-limit voltage is set to A as a value that is higher than 12.5V as the lower limit of the normal control range, and is lower than the OCV of the auxiliary-machine battery 420 (see step S103 of FIG. 4). In this case, the control range under the auxiliary-machine power reduction control is a control range a that is smaller than the normal control range (i.e., 12.5V to 13.5V). With the control as described above, it is possible to make the SOC of the auxiliary-machine battery 420 close to the target SOC through slower discharge than normal, while curbing reduction of the lifetime of the auxiliary-machine battery 420 due to the increased frequency of switching between the auxiliary-machine power reduction control and the high-voltage power generation control.

When the current SOC of the auxiliary-machine battery 420 is the same value as the target SOC (more specifically, when the current SOC of the auxiliary-machine battery 420 is within the range of +5% to −5% of the target SOC), the lower-limit voltage is set to B that is the same value as the OCV of the auxiliary-machine battery 420 (see step S105 of FIG. 4). In this case, the control range under the auxiliary-machine power reduction control is a control range b that is smaller than the above-described control range a. With the control as described above, it is possible to curb charging and discharging and thus keep the SOC of the auxiliary-machine battery 420 at the target SOC, while curbing reduction of the lifetime of the auxiliary-machine battery 420 due to the increased frequency of switching between the auxiliary-machine power reduction control and the high-voltage power generation control.

When the current SOC of the auxiliary-machine battery 420 is smaller than the target SOC (more specifically, when the current SOC of the auxiliary-machine battery 420 is smaller than the target SOC by more than −5%), the lower-limit voltage is set to C as a value that is lower than 13.5V that is the upper limit of the normal control range, and is higher than the OCV of the auxiliary-machine battery 420 (see step S106 of FIG. 4). In this case, the control range under the auxiliary-machine power reduction control is a control range c that is further smaller than the control range b as described above. With the control as described above, it is possible to make the SOC of the auxiliary-machine battery 420 close to the target SOC by curbing discharging and performing only charging, while curbing reduction of the lifetime of the auxiliary-machine battery 420 due to the increased frequency of switching between the auxiliary-machine power reduction control and the high-voltage power generation control.

As described above, with the power supply control system according to this embodiment, it is possible to make the SOC of the auxiliary-machine battery 420 close to the target SOC, while curbing reduction of the lifetime of the auxiliary-machine battery 420, which would be caused by increase of the frequency of switching between the auxiliary-machine power reduction control and the high-voltage power generation control.

It is to be understood that this disclosure is not limited to the above-described embodiment, but may be changed as needed without departing from the principle or concept of the disclosure which can be read from the appended claims and the specification as a whole. It is also to be understood that power supply control systems involving such changes are also included in the technical scope of this disclosure.

What is claimed is:

1. A power supply control system of a vehicle including a generator, a power storage unit that stores electric power generated by the generator, and one or more auxiliary machines that are driven by the electric power supplied from the power storage unit, the power supply control system comprising:
a first controller configured to perform auxiliary-machine power reduction control to reduce electric power consumed by the auxiliary machines, by setting a voltage of the generator so as to reduce an average value of voltages applied to the auxiliary machines;
a second controller configured to perform high-voltage power generation control to increase the voltage of the generator greater than the voltage of the generator that is set during the auxiliary-machine power reduction control, by inhibiting the auxiliary-machine power reduction control when the auxiliary machines perform a high-load operation;
a frequency determining unit configured to determine whether a frequency of switching, which indicates a number of times that switching between the auxiliary-machine power reduction control and the high-voltage power generation control occurs per time unit, becomes greater than or equal to or a predetermined frequency; and
a lower-limit voltage setting unit configured to set a lower-limit voltage of the generator under the auxiliary-machine power reduction control to a greater value when the frequency of switching is greater than or equal to the predetermined frequency, than when the frequency of switching is less than the predetermined frequency.

2. The power supply control system according to claim 1, wherein the vehicle includes an internal combustion engine as a power source, and the frequency determining unit is further configured to determine that the frequency of switching becomes greater than or equal to the predetermined frequency when a water temperature of a coolant of the internal combustion engine is greater than or equal to a predetermined first temperature.

3. The power supply control system according to claim 1, wherein the vehicle includes an electric motor as a power source, and a battery as an electric power supply source of the electric motor, and the frequency determining unit is further configured to determine that the frequency of switching becomes greater than or equal to the predetermined frequency when a temperature of the battery is greater than or equal to a predetermined second temperature.

4. The power supply control system according to claim 1, further comprising:
a setting unit configured to set a target charge amount as a target value of a charge amount of the power storage unit; and
a detecting unit configured to detect a current charge amount of the power storage unit,
wherein the lower-limit voltage setting unit is configured to:
set the lower-limit voltage to a lower value than an open voltage of the power storage unit when the current charge amount is greater than the target charge amount,
set the lower-limit voltage to a same value as the open voltage of the power storage unit when the current charge amount is equal to the target charge amount, and
set the lower-limit voltage to a higher value than the open voltage of the power storage unit when the current charge amount is less than the target charge amount.

* * * * *